United States Patent Office 3,163,652
Patented Dec. 29, 1964

3,163,652
PRODUCTION OF PIPERIDINE AND SUBSTITUTED PIPERIDINES FROM TETRAHYDROFURFURYL ALCOHOL
Donald G. Manly, Barrington, Joseph P. O'Halloran, Cary, and Fred J. Rice, Jr., Carpentersville, Ill., assignors to The Quaker Oats Company, Chicago, Ill., a corporation of New Jersey
No Drawing. Filed Mar. 23, 1962, Ser. No. 182,121
12 Claims. (Cl. 260—293.2)

This invention relates to a process for producing piperidine and substituted piperidines from tetrahydrofurfuryl alcohol.

As is known, the chemical piperidine has a number of commercial uses such as in the pharmaceutical industry and elsewhere. Moreover, piperidine and certain N-substituted derivatives thereof are widely used as starting materials in the preparation of the valuable organic solvent, pyridine. Because of this commercial utility, processes for producing piperidine and N-substituted derivatives thereof are highly desired.

Accordingly, it is one of the major objects of this invention to provide a process for producing piperidine in high yields.

It is another object of this invention to provide a process for producing in high yields piperidine and N-substituted piperidines which are useful in the chemical industry.

Another object of this invention is to provide a process for producing piperidine and N-substituted piperidines whereby high pressures are not necessary.

A further object of this invention is to provide a process for producing piperidine and N-substituted piperidines that employs relatively inexpensive materials and equipment.

In accordance with a preferred embodiment of this invention the foregoing objects are accomplished by contacting tetrahydrofurfuryl alcohol in the vapor phase with hydrogen and ammonia at elevated temperatures. The reactants are passed to the catalytic reaction zone in the vapor phase and reaction is carried out at low pressures which range from 0 up to about 80 pounds per square inch gauge. Preferably the reaction is carried out at pressures ranging from about 30 to 50 pounds per square inch gauge.

The amount of ammonia employed in the present process is controlled such that the molar ratio of ammonia to tetrahydrofurfuryl alcohol is from about 3 to about 30. The use of exceptionally low quantities of ammonia is conducive to thermal cracking and hydrogenolysis of the reaction products and thus is to be avoided. Likewise, the use of excessively high amounts of ammonia is also undesirable in that it prevents complete conversion of the tetrahydrofurfuryl alcohol to the desired end products. In a preferred manner of operation, the hydrogen and ammonia are supplied to the reaction zone in one stream with the ammonia content thereof being about 30 to 40 percent by volume. The hydrogen can be utilized in amounts in excess of that stoichiometrically required. Preferably, hydrogen is employed in such quantity that the molar ratio of hydrogen to the tetrahydrofurfuryl alcohol is in excess of about 7:1. The tetrahydrofurfuryl alcohol is fed to the reaction zone at a rate ranging from about 0.0136 to 0.184 gram per gram of catalyst per hour. A preferred feed rate for optimum piperidine yield is about 0.0241 gram per gram of catalyst per hour; higher feed rates favor the production of N-substituted piperidines. The feed rate of the recycle stream of ammonia and hydrogen can be varied from 300 to 5000 liters per hour with a preferred rate being 1800 liters per hour.

The reaction is carried out at elevated temperature not substantially in excess of 200° C. The lower temperature limit is not fixed since any lower temperature at which the desired conversion occurs can be employed. However, the use of excessively low temperatures results in low conversion and the production of undesired by-product materials. Generally, the reaction is carried out at a temperature ranging from about 100° C. to 200° C. Preferably the reaction is carried out at a temperature of about 175° C.

The catalyst employed in the process of this invention which has been found unique in achieving the desired results and the use of which is therefore critical is a highly active reduced nickel catalyst such as for example nickel hydrate, nickel formate and the like which has been reduced at a temperature below about 450° C., reoxidized by pasisng a gas containing free oxygen over the reduced catalyst, and again reduced by passing a gas thereover containing free hydrogen at a temperature below about 250° C.

Subsequent to reducing the nickel catalyst at a temperature below about 450° C. as described above, the nickel catalyst material is preferably partially reoxidized by passing a gas containing free oxygen thereover until the ratio of reduced nickel to total nickel is about 55 percent. The final reduction of the nickel material is then preferably obtained by passing a gas thereover initially containing about 5 percent hydrogen and about 95 percent nitrogen, the hydrogen content having been progressively increased to 100 percent so that the temperature of the latter reduction step is maintained below about 250° C.

The reduced nickel catalyst can be used as such or it may be supported on any suitable support such as alumina, kieselguhr, pumice, alundum, charcoal or the various natural or synthetic clay-like supports that are known to the art. In adidtion, the catalyst composition can be modified if desired to incorporate certain basic substances such as sodium silicate, calcium oxide, magnesium oxide or the like.

Employing optimum conditions of operation, piperidine yields as high as 60–75 percent of theoretical can be consistently obtained by the process of the invention with the combined yield of piperidine and other desired N-substituted piperidine compounds being even higher. The N-substituted piperidine compounds which are produced by the present invention include N-tetrahydrofurfuryl piperidine, N-propyl piperidine, N-butyl piperidine and N-amyl piperidine. Other reaction products include diamyl amine, tetrahydrofurfuryl amine, water and trace amounts of pyridine. It is noteworthy that the entire reaction product without undergoing any separation can be utilized to produce pyridine in high yields if so desired. The piperidine, tetrahydrofurfuryl piperidine and tetrahydrofurfuryl amine can be converted to pyridine in substantially quantitative amounts.

The invention will be further illustrated by the following detailed desccription in which the quantities of reactants are as indicated.

A reduced and stabilized catalyst was prepared by the following procedure. Unreduced nickel-kieselguhr tablets were loaded into a vertical reactor. The system was purged with nitrogen and brought to about 260° C. Hydrogen flow was started and the temperature gradually increased to about 427° C. This temperature was maintained by circulating the hydrogen through an external heater. It was necessary to dry the circulating gases by passing them through an external dryer. When the formation of water had virtually stopped, the system was cooled to about 32° C. maintaining hydrogen flow. When this system had reached this temperature it was purged with nitrogen. The reduced catalyst was partially re-oxidized by adding a small quantity of oxygen with the inert gas. The temperature was maintained below about 57° C. by adjusting the amount of oxygen present. The peak temperature was measured and when this temperture reached the bottom of the reactor the stabilization was complete. After stabilization the system was flushed with air to atmospheric conditions. In this form the catalyst contained about 60% nickel with a ratio of reduced nickel to total nickel of about 55%.

The reduced and stabilized catalyst (2280 grams) was charged into a column heated by means of a circulating oil. The catalyst was reduced by passing pure hydrogen down through the column starting at about 140° C. Over a period of four hours the temperature was gradually raised to about 200° C. and held until no further water was given off. After reduction of the catalyst the temperature was lowered to 175° C. The oil-jacketed steel reactor tube was included in a hermitcally joined system comprising a recycle compressor, hydrogen inlet, ammonia inlet, flowmeter, preheater, reactor tube, condenser, product tank, and purge. The system was pressurized as indicated below with hydrogen and ammonia in such manner as to give a resultant gas stream containing varying quantities of ammonia. Tetrahydrofurfuryl alcohol was then introduced to the preheater or vaporizer at a variable rate is indicated below where it was mixed with the ammonia and hydrogen. During the course of the operation, ammonia was constantly metered into the system and the pressure was maintained externally by allowing free uptake of hydrogen. The rate of flow of the recycle gas comprising a mixture of hydrogen and ammonia as well as its molecular weight was as shown below. The ammonia level in the recycle gas was maintained as indicated by purging with hydrogen purge gas. The crude product as obtained from the reactor was azeotroped with benzene to effect separation of water from the mixture. The resulting benzene solution was analyzed by direct vapor phase chromatography.

The operating conditions and results of operating according to the above procedure are shown in Table I. In the table below, each numbered run represents the average of four individual runs.

Table I

| Run No. | Oil Temp., °C. | Press., p.s.i.g. | RECYCLE | | | $NH_3$ makeup, Mol/hr. | $H_2$ makeup, liters/hr. | Feed Rate, ml./hr. | Recov., percent actual | $H_2O$ |
|---|---|---|---|---|---|---|---|---|---|---|
| | | | MW | Flow, liters/hr. | $NH_3$ level, Mol percent | | | | | |
| 1 | 177 | 6 | 7.1 | 295 | | 0.5 | 14 | 75 | 106.5 | 1.859 |
| 2 | 175 | 45 | 4.9 | 2,090 | 20 | 1.0 | 68 | 52 | 129.0 | 1.864 |
| 3 | 175 | 45 | 8.1 | 4,750 | 30 | 2.2 | 64 | 97 | 120.4 | 1.915 |
| 4 | 167 | 45 | 7.7 | 4,400 | 30 | 2.2 | 73 | 96 | 120.8 | 1.808 |
| 5 | 182 | 45 | 7.6 | 4,630 | 30 | 2.2 | 85 | 94 | 118.2 | 1.938 |
| 6 | 175 | 45 | 8.3 | 4,870 | 40 | 2.2 | 45 | 98 | 118.9 | 1.904 |
| 7 | 175 | 45 | 9.6 | 3,490 | 50 | 2.2 | 28 | 94 | 119.0 | 1.825 |
| 8 | 175 | 45 | 9.2 | 2,290 | 50 | 1.3 | 20 | 60 | 124.0 | 1.926 |
| 9 | 175 | 45 | 7.8 | 1,990 | 30 | 4.0 | 64 | 205 | 120.0 | 1.859 |
| 10 | 177 | 45 | 7.9 | 1,660 | 30 | 4.0 | 64 | 321 | 118.5 | 1.737 |
| 11 | 175 | 45 | 7.2 | 1,340 | 30 | 4.0 | 64 | 319 | 119.5 | 1.714 |
| 12 | 175 | 6 | 6.9 | 1,710 | 30 | 4.9 | 198 | 324 | 115.0 | 1.406 |
| 13 | 183 | 6 | 9.5 | 1,440 | 30 | 1.7 | 50 | 208 | 116.1 | 1.831 |
| 14 | 175 | 60 | 6.4 | 1,940 | 30 | 4.8 | 173 | 224 | 118.8 | 1.871 |

| Run No. | Moles of THFA Equivalent Per Mole Fed | | | | | | | THF amine | Unknown | Loss | Pip Yield Percent Theor. |
|---|---|---|---|---|---|---|---|---|---|---|---|
| | Pip | Pyr | N-Bu Pip | THF Pip | n-Am Pip amine | Diamyl-amine | n-Pr Pip | | | | |
| 1 | 0.350 | 0.005 | 0.196 | 0.295 | 0.031 | 0.027 | 0.015 | 0.000 | 0.019 | 0.062 | 35.0 |
| 2 | 0.657 | 0.000 | 0.111 | 0.050 | 0.034 | 0.003 | 0.004 | 0.000 | 0.044 | 0.097 | 65.7 |
| 3 | 0.672 | 0.002 | 0.072 | 0.099 | 0.019 | 0.000 | 0.000 | 0.029 | 0.043 | 0.064 | 67.2 |
| 4 | 0.529 | 0.002 | 0.025 | 0.222 | 0.012 | 0.000 | 0.000 | 0.079 | 0.050 | 0.054 | 52.9 |
| 5 | 0.617 | 0.003 | 0.085 | 0.029 | 0.025 | 0.000 | 0.000 | 0.006 | 0.052 | 0.183 | 61.7 |
| 6 | 0.683 | 0.002 | 0.060 | 0.080 | 0.019 | 0.000 | 0.000 | 0.022 | 0.042 | 0.092 | 68.3 |
| 7 | 0.677 | 0.006 | 0.076 | 0.077 | 0.020 | 0.000 | 0.000 | 0.029 | 0.046 | 0.069 | 67.7 |
| 8 | 0.754 | 0.006 | 0.092 | 0.021 | 0.034 | 0.000 | 0.000 | 0.009 | 0.048 | 0.036 | 75.4 |
| 9 | 0.477 | 0.003 | 0.074 | 0.287 | 0.015 | 0.000 | 0.000 | 0.031 | 0.045 | 0.068 | 47.7 |
| | | | | | | | THFA | | | | |
| 10 | 0.359 | 0.001 | 0.049 | 0.317 | 0.008 | 0.000 | 0.030 | 0.113 | 0.025 | 0.097 | 35.9 |
| 11 | 0.358 | 0.001 | 0.046 | 0.319 | 0.011 | 0.000 | 0.021 | 0.118 | 0.034 | 0.902 | 35.8 |
| 12 | 0.275 | 0.001 | 0.031 | 0.194 | 0.004 | 0.000 | 0.155 | 0.202 | 0.039 | 0.099 | 27.5 |
| 13 | 0.420 | 0.008 | 0.098 | 0.217 | 0.013 | 0.000 | 0.024 | 0.051 | 0.052 | 0.117 | 42.0 |
| 14 | 0.428 | 0.003 | 0.069 | 0.335 | 0.023 | 0.000 | 0.000 | 0.013 | 0.040 | 0.089 | 42.8 |

As is evident from Table I, good yields of piperidine and N-substituted derivatives of piperidine are obtained by the process of the present invention. Moreover, it has been found that the piperidine content of the product can be increased by recycling the crude product over the catalyst. The advantages of this embodiment of the invention are demonstrated by the following experimental data which was obtained by recycling the crude reaction product over the catalyst under the conditions shown in Table II.

Table II

| | Initial Product | Recycled Product |
|---|---|---|
| Temperature, °C | 175 | 184 |
| Pressure, p.s.i.g | 45 | 45 |
| Recycle: | | |
| MW | 7.5 | 9.3 |
| Flow, liters/hr | 2,100 | 1,640 |
| $NH_3$ level, mole percent | 30 | 30 |
| $NH_3$ makeup, moles/hr | 4.1 | 3.1 |
| $H_2$ makeup, liters/hr | 70 | 73 |
| Feed rate, ml./hr | 214 | 217 |
| Recovery, percent actual | 116 | 127 |
| $H_2O$ | 1.740 | 2.170 |
| Piperidine | 0.552 | 0.748 |
| Pyridine | 0.004 | 0.006 |
| n-Butylpiperidine | 0.070 | 0.109 |
| Tetrahydrofurfuryl piperidine | 0.217 | 0.043 |
| n-Amylpiperidine | 0.015 | 0.033 |
| Diamylamine | 0.023 | 0.026 |
| Tetrahydrofurfuryl amine | 0.021 | 0.009 |
| Tetrahydrofurfuryl alcohol | 0.004 | 0.000 |
| Unknowns | 0.019 | 0.026 |
| Loss | 0.075 | 0.000 |

It will be noted from the data in Table II that the piperdine content of the recycled product increased with a corresponding decrease in the content of tetrahydrofurfuryl piperidine. This indicates a substantially quantitative conversion of one mole of tetrahydrofurfuryl piperidine to two moles of piperidine.

The advantages of the present invention are apparent from the foregoing description and experimental data. By means of the process of the invention, piperidine and/or desirable N-substituted derivatives thereof are produced in high yields from tetrahydrofurfuryl alcohol, utilizing low reaction pressures. The entire reaction product of the process of the invention can be utilized directly for production of pyridine, if desired, without the necessity of first performing costly and time-consuming separation processes. Alternatively, piperidine can be separated as a reaction product in high yields by conventional procedures, such as azeotropic distillation.

The process of the invention eliminates the need of expensive high pressure reaction equipment and is operable at elevated but not excessively high temperatures. The advantages of the present invention are particularly unique with the use of nickel catalysts reduced as specified. The reduced nickel catalysts can be used in the process of the invention for long periods without significant deactivation.

Those modifications and equivalents which fall within the spirit of the invention and the scope of the appended claims are to be considered part of the invention.

We claim:

1. A process for producing piperidine and N-substituted derivatives thereof which comprises contacting tetrahydrofurfuryl alcohol in vapor phase with ammonia and hydrogen at elevated temperatures in the presence of a nickel catalyst which has been reduced at a temperature below about 450° C., reoxidized by passing a gas containing free oxygen over the reduced catalyst, and again reduced by passing a gas thereover containing free hydrogen at a temperature below about 250° C.

2. The process of claim 1 wherein the tetrahydrofurfuryl alcohol is contacted with ammonia and hydrogen at a temperature within the range from about 100 to about 200° C.

3. The process of claim 1 wherein the contacting of the tetrahydrofurfuryl alcohol with ammonia and hydrogen is effected at a temperature of about 175° C.

4. The process of claim 1 wherein the contacting of the tetrahydrofurfuryl alcohol with ammonia and hydrogen is effected at a pressure of from about 0 to about 80 p.s.i.g.

5. The process of claim 1 wherein the ammonia is used in an amount from about 3 moles to about 30 moles per mole of tetrahydrofurfuryl alcohol.

6. A process for producing piperidine which comprises contacting tetrahydrofurfuryl alcohol in vapor phase with ammonia and hydrogen at elevated temperatures in the presence of a nickel catalyst which has been reduced at a temperature below about 450° C., reoxidized by passing a gas containing free oxygen over the reduced catalyst, and again reduced by passing a gas thereover containing free hydrogen at a temperature below about 250° C. and separating piperidine from the reaction product.

7. The process of claim 6 wherein the tetrahydrofurfuryl alcohol is contacted with ammonia and hydrogen at a temperature within the range of from about 100 to 200° C.

8. The process of claim 6 wherein the contacting of the tetrahydrofurfuryl alcohol with ammonia and hydrogen is effected at a pressure from about 0 to about 80 p.s.i.g.

9. The process of claim 6 wherein the tetrahydrofurfuryl alcohol is contacted with ammonia and hydrogen at a temperature of about 175° C.

10. The process of claim 6 wherein the contacting of the tetrahydrofurfuryl alcohol with ammonia and hydrogen is effected at a pressure from about 30 to about 50 p.s.i.g.

11. The process of claim 6 wherein the ammonia is used in an amount from about 3 moles to about 30 moles per mole of tetrahydrofurfuryl alcohol.

12. A process for producing piperidine which comprises contacting tetrahydrofurfuryl alcohol in vapor phase with ammonia and hydrogen at a temperature within the range from about 100 to about 200° C. and a pressure from about 0 to about 80 p.s.i.g. in the presence of a nickel catalyst which has been reduced at a temperature below about 450° C., reoxidized by passing a gas containing free oxygen over the reduced catalyst, and again reduced by passing a gas thereover containing free hydrogen at a temperature below about 250° C., and recycling the reaction product over the catalyst to increase the piperidine content of the reaction product and then recovering piperidine.

References Cited in the file of this patent
UNITED STATES PATENTS
2,265,201    Schmidt et al. _____ Dec. 9, 1941

UNITED STATES PATENT OFFICE
CERTIFICATE OF CORRECTION

Patent No. 3,163,652 December 29, 1964

Donald G. Manly et al.

It is hereby certified that error appears in the above numbered patent requiring correction and that the said Letters Patent should read as corrected below.

Columns 3 and 4, Table I, under the heading "N-Bu Pip", opposite Run No. 4, for "0.025" read -- 0.052 --; same Table I, under the heading "Loss", opposite Run No. 11, for "0.902" read -- 0.092 --; column 4, Table II, under the heading "Recycled Product", line 6 thereof, for "3.1" read -- 3.4 --.

Signed and sealed this 4th day of May 1965.

(SEAL)
Attest:

ERNEST W. SWIDER
Attesting Officer

EDWARD J. BRENNER
Commissioner of Patents